Figure 1:
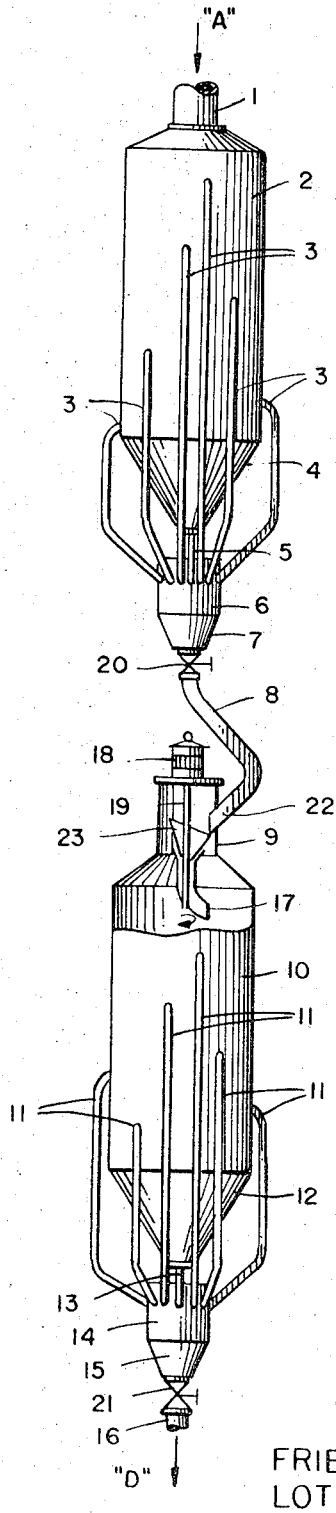

United States Patent

[11] 3,550,913

| [72] | Inventors | Friedrich Jaeger<br>Bad Hersfeld;<br>Lothar Loew, Elsenfeld; Hans-Joachim<br>Tzschoppe, Wuppertal, Germany |
| --- | --- | --- |
| [21] | Appl. No. | 795,164 |
| [22] | Filed | Jan. 30, 1969 |
| [45] | Patented | Dec. 29, 1970 |
| [73] | Assignee | Glanzstoff AG<br>Wuppertal, Germany |
| [32] | Priority | Feb. 2, 1968 |
| [33] | | Germany |
| [31] | | No. 1,607,773 |

[54] METHOD AND APPARATUS FOR MIXING GRANULATED MATERIAL
10 Claims, 2 Drawing Figs.

[52] U.S. Cl. ..................................................... 259/8
[51] Int. Cl. ..................................................... B01f 7/16
[50] Field of Search .......................................... 259/150,
180, 4, 8, 6, 7, 23, 24, 43, 44

[56] References Cited
UNITED STATES PATENTS

| 3,158,362 | 11/1964 | Seifarth | 259/180 |
| 3,208,737 | 9/1965 | Brown | 259/180 |
| 3,317,191 | 5/1967 | Brown | 259/4 |
| 3,456,922 | 7/1969 | Gains | 259/4 |

Primary Examiner—Robert W. Jenkins
Attorney—Johnston, Root, O'Keeffe, Keil, Thompson & Shurtleff ABSTRACT: Process and apparatus for the gravity-flow mixing of solid granules or particles wherein conventional mixing by withdrawing random samples of a granular material from a storage tank at various levels and recombining the samples in a receiver or manifold is enhanced by subjecting the initially mixed granules to a cross-mixing, preferably by a rotating distributor element, as they are conducted from said receiver into a second storage tank where the same operation can be repeated.

PATENTED DEC 29 1970

3,550,913

SHEET 1 OF 2

INVENTORS:
FRIEDRICH JAEGER
LOTHAR LÖW
HANS-JOACHIM TZSCHOPPE
BY
Johnston, Root, O'Keeffe, Keil, Thompson & Shurtleff
ATT'YS

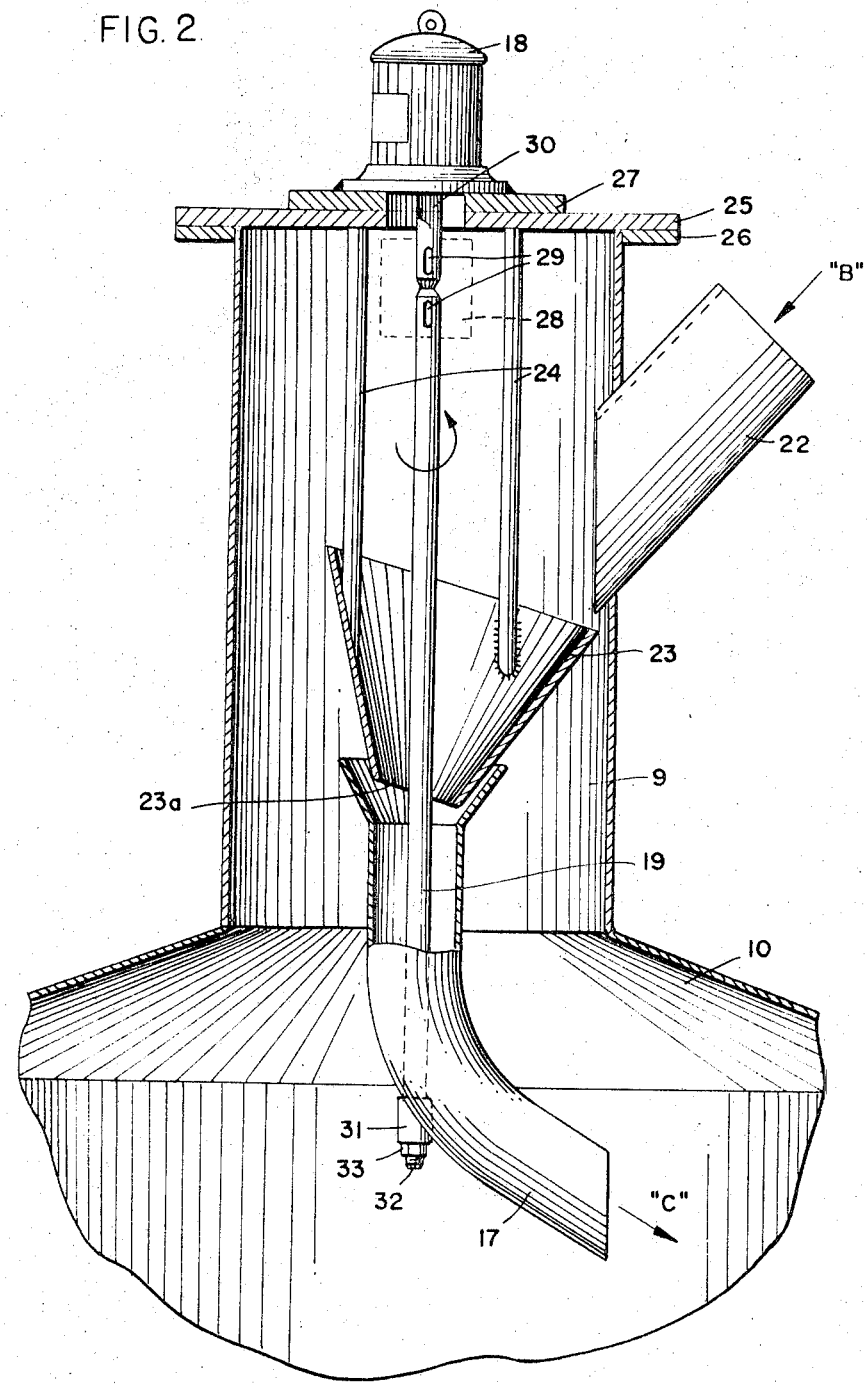

METHOD AND APPARATUS FOR MIXING GRANULATED MATERIAL

With the further use of many types of pourable or free-flowing solid granulated material, it is important to obtain constant and homogeneous properties of the material over relatively long time periods or with relatively large quantities of such material. Thus, when synthetic plastic materials are extruded, a product of homogeneous composition is only obtained if the granulated material is already premixed to such a degree that differences in physical or chemical properties resulting from different production runs of the initial polymer are substantially eliminated. Similar problems exist with the spinning of endless filaments or yarns from the melt of a synthetic thermoplastic fiber-forming polymer. In order to avoid differences in the properties of the resulting yarns or threads, the melts are frequently transformed into the form of cuttings or chips or similar discrete particles, and several batches of said particles are thoroughly mixed before they are again melted and finally spun.

In connection with the thorough mixing of different batches of pourable, granular material, there are essentially three different mixing methods available: (1) mechanically driven mixers, (2) pneumatically operated mixers or (3) mixers which make use of the force of gravity.

The use of mechanically driven mixing arrangements, such as drum-type mixers, stirrer mechanisms and the like, when mixing relatively large quantities of pourable, granular material, is usually not adopted solely because of the high amount of energy which is required. With mixing arrangements of this type, a large part of the energy introduced through the drive for mixing purposes is actually used in the form of comminution energy to the granulated material, i.e. so as to break down or grind the original granules during mixing. Thus, although the granules are originally supplied before the mixing operation as grains of about equal size, the mixed product also contains a rather considerable proportion of fine grains after the mixing operation as well as the original coarse grain. This fine grain fraction often contributes to undesirable separation phenomena and, even when the fraction is small, it has a nuisance value in connection with the further processing of the mixed product.

Pneumatically operated mixers likewise require a very large supply of energy, to which is usually added a considerable expenditure for equipment. Due to the high gas velocities which are necessary for whirling particles or grains of material having a size of a few millimeters, heavy abrasion and a comminution of the material because of rebound are also found when carrying out the mixing pneumatically.

Because of these disadvantages of the mixing methods which use mechanically driven or pneumatically operated mixing equipment, it is much more conventional to employ mixing methods which are better adapted to the mixing of large quantities of pourable, granular material and particularly those methods in which the force of gravity or the free descent of the granules of material is utilized. With mixing methods of this so-called gravity-flow type, the material must first be brought continuously or in batches by a lifting operation to a higher potential energy level. It is then possible to allow the material to trickle or flow downwardly through a container or a container system and to produce mixing of the separate batches by suitable fittings, conduits or manifolds.

The present invention comes within the group of mixing methods and mixing apparatus as last defined, i.e. gravity-flow mixers or blenders. This type of method is especially useful for automatically mixing different batches of solid, pourable, granular material, in which the batches are poured successively and with formation of vertically superimposed or stratified layers into a first elevated storage container, the material is withdrawn downwardly and simultaneously in separate partial streams of approximately the same size from different layers and preferably at different radial locations, and these partial streams are brought together outside the storage container.

By the term "automatic mixing," there is to be understood a mixing in which the force of gravity or the free descent of the particles of material is utilized.

By "batch," with the method which is operated continuously, there is to be understood the quantity of material poured per unit of time into the elevated storage vessel, whereas when the storage vessel is filled intermittently, the word "batch" is to be understood as the content of a single transport or storage container.

It is generally known to produce an automatic mixing of different batches of pourable, granular material by first consolidating the different batches often with formation of vertically superimposed layers in a storage container, and then simultaneously withdrawing the material downwardly by gravity flow in separate partial streams of approximately the same size from different layers or positions within the storage container, and then bringing these partial streams together outside the storage container, e.g. into a receiver positioned therebelow.

One known apparatus for carrying out such a gravity-flow mixing operation, as disclosed in U.S. Pat. No. 455,082, consists of a storage container, the base surface of which is surrounded by a regular hexagon. The lower outlet is formed by a hopper, which has the form of a six-sided, regular pyramid and the apex of which is hollowed out as a central discharge outlet, so that the material can trickle through. Terminating inside the storage container are twelve discharge pipes at different heights with upwardly directed discharge openings. These pipes are guided through the hopper wall and terminate outside the storage container at approximately the same height, and actually so as to terminate inside a collecting bin or receiver, in which, depending on the position of a slide member, the material trickling out of the storage container through the discharge pipes can flow through unimpeded or can also be obstructed. If the position of the slide member is so chosen that the material accumulates in the collecting bin, the lower openings of the discharge pipes are all closed or opened at the same time by the cone of material which is forming beneath them. The result is a simultaneous withdrawal of component streams of approximately the same size from different layers.

If the material to be mixed is conducted only once through an apparatus of this known type, the mixture produced thereby must be considered as unsatisfactory. Such vertical separation and recombination of individual particle streams simply does not yield a sufficient mixing where one must achieve very careful quality control and a highly homogeneous mixture for subsequent processing steps.

The apparatus according to this early patent makes possible only a proportioning of component quantities of equal size from different regions of the container rather than a complete mixing. These component quantities fill the collecting container or receiver in the form of juxtaposed strands which essentially contain those particles of the layer from which the extraction pipe terminating above the flowing strands is discharging.

According to later developed methods, as disclosed in U.S. Pats. Nos. 3,106,385 and 3,158,362, an attempt is made to achieve a subsequent thorough mixing of these strands by combining the proportionate amounts drawn off from different layers beneath the storage container and then conveying the recombined portions by pneumatic means to the upper end of the storage container, from whence they once again flow through the storage container in accordance with the known principle. The number of circulations through the storage container then determines the quality of the mixed materials, i.e. the efficiency of mixing.

This method has a number of disadvantages. First, it necessitates the constant operation of an air compressor because of the particular circulation procedure being used. Also it is not possible to avoid the formation of fine material due to abrasion and comminution, whereby one essential and desirable advantage of gravity-flow mixing is negated or substantially lost. Furthermore, the circulating pipe is exposed to a heavy stress by the edges of the granular material and has to be constantly supervised and/or replaced. Finally, despite the high expense as regards energy and equipment, the mixed materials are still not always to be considered satisfactory, even when the upper ends of the extraction or discharge pipes are distributed in the best possible manner within the storage container.

One object of the present invention is to improve the quality and homogeneity of the mixture when different batches of a solid, pourable, granular material are automatically mixed, and at the same time to substantially maintain all of the advantages of a mixing method which uses only gravitational force. Other objects and advantages of the process and apparatus of the invention will become more apparent upon consideration of the following detailed disclosure.

It has now been found, in accordance with the invention, that one can achieve a substantial improvement in the conventional gravity-flow mixing of a solid, pourable granular material contained in a vertically elongated storage zone by simultaneously withdrawing said material downwardly by gravity from the storage zone in a plurality of individual, approximately equally sized streams originating at different heights or levels within said storage zone, and then leading the partial streams back together again outside of the storage zone, provided that the reunited partial streams of the granular material are conducted downwardly by gravity through a conveyor tube and the individual granules are subjected to a transverse or horizontal cross-mixing while discharging them from the conveyor tube, e.g. into a second storage zone. In order to achieve this cross-mixing in a relatively efficient manner, it is especially advantageous to conduct the reunited partial streams through a conveyor tube whose discharge outlet is rotated and is directed at least partially laterally outwardly around the vertical axis of the second storage zone.

By including such a horizontal or transverse distribution or dispersion of the individual granules, the juxtaposed strands of the reunited partial streams are broken up and effectively cross-mixed while also permitting the granules to continue their gravity flow without being damaged, i.e. without causing any appreciable attrition or comminution of individual particles into extremely fine or odd sized particles. Experiments have shown that such results cannot be achieved merely by using two identical apparatus of the known type, one being placed below the other, because the reunited or recombined partial streams being drawn off as substantially parallel or juxtaposed strands in a discharge tube cannot be properly broken up to yield an efficient mixing. By comparison, the process of the present invention permits an extremely efficient cross-mixing with only a very low energy input to achieve a transverse or rotational discharge of the particles, especially when the particles have already acquired a vertical component in the direction of flow as they are being discharged. The additional mechanical energy is only required to produce a transverse or rotational dispersion or spreading of the discharge stream, i.e. a horizontal component of the direction of flow.

Since it is the transverse mixing which is of great importance for purposes of the present invention, it is already sufficient in some instances of mixing to simply discharge the transversely mixed material for further use or subsequent storage and processing. In this case, the second storage zone can be of any size, shape or function and may include tanks, hoppers, bins, feeding mechanisms or transport means where storage may be relatively permanent or may also constitute a continuously moving support or a feed hopper for subsequent steps. However, in those cases where it is especially important to ensure an increased homogeneity of the mixture, the transversely mixed material is preferably supplied to a second vertically elongated storage container. The completeness of the mixing is then still further improved by downwardly withdrawing the material from this second storage container in a plurality of discharge streams, and then again recombining these streams in the same conventional manner as with the streams emerging from the first storage zone.

If extremely high demands are placed on the homogeneity of the mixture, for example, when mixing colored granules or chips from different production runs of an initial polymer, it is recommended that a second distributor system for transverse mixing be arranged after the second storage zone, so that cross-mixing also takes place with the reunited streams emerging from this second storage zone. Even further storage, receiving and transverse mixing zones can be added in vertical sequence, but two complete systems are normally sufficient.

The method according to the invention is advantageously carried out continuously. In this case, after having once filled the upper storage container, such a quantity of material is then continuously poured into the latter as that amount which is being extracted or discharged by means of a controlled manifold or conventional receiving bin. The extracted material, after the transverse mixing is effected, is poured into the second storage container. This latter is then only opened when it is full. The same quantity as is supplied from the upper receiving bin is then always extracted or discharged from the lower or second storage container.

The method of the present invention, however, can also be carried out intermittently. In this case, the upper storage container is filled batchwise and thereafter is completely emptied, with an even proportioning of the individual discharge streams and transverse mixing of the reunited streams as they are discharged into the second storage container. From this second storage container or from a second receiving bin which is situated beneath it, the premixed material can also be extracted batchwise with a final thorough mixing. It is particularly advantageous to carry out the method of the invention intermittently when the storage containers are essentially being employed as a storage silo and individual batches are in fact merely removed therefrom at various intervals as required.

According to another aspect of the present invention, there is provided a gravity-flow mixing device or apparatus which includes a vertically elongated storage container or tank, a receiving bin or manifold located below the storage tank, a plurality of discharge pipes or tubes whose upper ends respectively terminate at different heights and radial positions within said storage tank and whose ends respectively terminate, preferably at the same height, within said receiving bin, means to feed charges or batches of granular material to be mixed into said storage tank, and means for the controlled withdrawal of the mixed material from said receiving bin. In combination with this structure, the device of the invention provides a second elongated storage tank positioned below the receiving bin, conduit means to feed the initially mixed granular material from the receiving bin by gravity to the second storage tank and a rotating distributor means within said second storage tank adapted to redistribute individual granules horizontally of said tank from said conduit means.

By means of the apparatus of the invention and especially the arrangement of the rotating distributor means, the flow of granular material which contains the recombined streams or strands and which is being conducted from the receiving bin, preferably at a controlled rate, is distributed with a breaking up or scattering of the earlier combined streams over the entire cross-sectional area of the lower storage container. Since the distributor means requires very little energy and causes only a slight deviation in the path of flow of the discharge stream, the desired cross-mixing is achieved without the individual particles being subjected to any wear or tear which would lead to abrasion or comminution.

In order to fulfill the highest possible standards as regards the mixed material, an additional distributor means can be inserted after a second lower storage tank and receiving bin.

The invention is more fully explained by reference to the accompanying drawings, wherein:

FIG. 1 is a partly schematic side elevation view of one preferred embodiment of the apparatus of the present invention, the upper part of the lower storage tank being broken away in order to illustrate the essential elements of the distributor means; and FIG. 2 is a longitudinal section taken through an enlarged segment of the upper part of the lower storage tank and its distributor means.

As will be seen from FIG. 1, individual batches of a solid, pourable, granular material which are to be mixed flow in the direction of arrow "A" through a suitable supply conduit 1 and can be deposited in layers in the upper storage tank or container 2. From the tank 2, the free-flowing granular material is extracted or discharged downwardly through the openings of the discharge pipes 3 which terminate within the upper storage tank 2 and also through a central discharge pipe 5 which extends from a central opening at the lower end of a conical discharge hopper 4. The resulting discharge streams are then combined in an upper receiving bin or manifold 6. By terminating the lower ends of the discharge pipes 3 and 5 at about the same height in the receiving bin 6, proportionate quantities of approximately equal size are introduced and withdrawn from each of the receiver or manifold zones. From outlet 7 of the receiving bin, the premixed material passes through a control valve 20, e.g. in the form of a slide member, into the connecting discharge tube or pipe 8, which the granular fills in the form of juxtaposed strands of the previously reunited streams. The granular material then passes through supply pipe 22 of attachment or cap 9 with free descent into a deflecting hopper or funnel 23 and from thence into a rotating distributor element 17, which is driven by an electric motor 18 via drive shaft 19. On leaving the discharge opening of distributor element 17, the material is uniformly distributed or sprayed over the entire cross section of a lower storage container 10, the strands or streams of granules being substantially broken up by the resulting transverse mixing.

The material is drawn off from the lower storage tank or container 10 through the discharge pipes 11 and also through a lower conical discharge hopper 12 by means of a central discharge pipe 13, and the individual streams are then united in a lower receiving bin 14. From outlet 15 of this receiving bin, the granular material, after flowing through control valve 21, passes through discharge outlet 16 in the direction of arrow "D" for being further processed. Alternatively, the outlet 16 can be coupled to a second rotating distributing means for further transverse mixing as the material is supplied to a third storage container or other means to receive the distributed material.

The essential distributor means is more fully explained by reference to FIG. 2. It is preferably arranged in the upper extension or cap 9 of the lower storage container 10 and consists essentially of a supply or feed pipe 22, a deflecting hopper or funnel 23 and a vertically positioned, rotatable distributor element in the form of a tube having its lower end 17 bent laterally outwardly.

The distributor element 17 shown in the drawing actually consists of a curved pipe with a beveled discharge outlet. However, it can also be provided with another shape and may for example be constructed as an inclined plate or trough. The shape thereof should ensure, however, that all the flow of material is deflected to one side and preferably with a circulating motion. This one-sided or lateral deflection has surprisingly produced a much better transverse mixing, as compared with a deflection on all sides with a horizontal centrifuge plate.

The deflecting hopper 23 is fixed in its position relatively to supply pipe 22 by several stationary anchoring tubes or rods 24, which are welded to the hopper 23 and to a cover or closure plate 25. Extending through a central outlet 23a of the deflecting hopper is the drive shaft 19, and a bushing 31 is tightly screwed by means of a nut 33 on the threaded end 32 of the shaft 19. The bushing 31 is welded to the tubular distributor element 17 and causes the transmission of the rotational movement of the drive shaft 19 to the distributor element 17.

The shaft 19 itself is connected through a clutch 28 (only indicated by dotted lines) and splines 29 to the stub shaft 30 of the electric motor 18, which is fixed by a flange 27 on the cover 25. This cover in turn is screwed or bolted tightly to the flange 26 of the extension or cap 9.

The arrow "B" indicates the direction of the supply of granular material into the distributor system, and arrow "C" indicates the direction in which the granular material leaves the outlet of the distributor element 17. This direction "C" has a downwardly extending vertical component, so that the particles themselves, even with high speeds of rotation of the distributor element 17, are not centrifuged perpendicularly against the wall of the lower storage container 19, but in all cases come into contact with the wall at a very acute angle, if at all, so that the particles are exposed to a negligibly small stress due to rebound from the surrounding wall.

The degree of the transverse mixing can be varied by the angle which the outlet direction of the material (arrow "C") forms with the axis of the lower storage container 10 and by the speed of rotation of the distributor element 17. The distance of the curved end of the distributor element 17 from the axis of the shaft 19 can likewise be considered as having an influencing effect. This angle and the shape of the outlet of discharge tube 17 is preferably so chosen that the material leaving the distributor element 17 covers the largest possible part of the cross-sectional surface of the lower storage tank 10.

Comparison Test A

In a mixing apparatus of the known type as described in the most recent development of this art, two storage containers, each with a system of discharge pipes at various levels and each with a receiving bin or manifold, are connected in series in a manner similar to FIG. 1, but without any interposition of a distributor member for the essential transverse mixing of the invention. Altogether, 18 tons of delustered Perlon (polycaprolactam) cuttings or granules were mixed. For this purpose, 6 tons of Perlon cuttings of Type E, 3 tons of Perlon cuttings of Type F and 9 tons of Perlon cuttings of Type E were poured successively into the upper storage container, in batches each of 1½ tons. Types E and F are two crystallographically different modifications of the titanium dioxide contained in the delustered Perlon. The cuttings or granules which only differ from one another in this way exhibit the same electrostatic charging, so that a deterioration of the mixed material due to different electrostatic charging is impossible. The different titanium dioxide modifications permit a simple evaluation of the final product mixture by X-ray analysis, after reducing the samples to ashes. After filling the upper storage container, a first batch of about 1½ tons of granules were allowed to run into the lower storage container and once again poured into the upper storage container. The total contents of the upper storage container were then allowed to flow into the lower storage container, in order to then completely empty the latter batchwise.

10 samples, each comprising 10 grams of granular material, were extracted from each batch of 1½ tons of the prepared mixture, reduced to ashes and subjected to an X-ray analysis. The result of the analysis obtained was that the standard deviation of the mixture was 3.5 to 3.4 times as great as that of a completely random mixture.

Comparison Test B

In order to determine to what extent the mixing quality or efficiency can be improved in a continuous mixer operated over a long period of time, the mixture obtained according to the comparison Test A was again mixed in 6 batches, each of 3 tons, in a tumbler mixer, until it was not possible to detect any improvement in the degree of mixing. Then altogether 100 samples of granular material, each of 10 grams, were taken and analyzed. The standard deviation of this long-period mixing was about 1.3 to 1.7 times as high as that of a completely random mixing.

EXAMPLE

When a similar test was carried out using the apparatus of the present invention otherwise following the same procedure as in comparison Test A, 18 tons of delustered Perlon cuttings were first introduced into the upper storage container. First runnings of about 1½ tons were allowed to flow through the distributor element and the lower storage container and these first runnings were once again poured into the upper storage container, thus providing several distinct stratified layers as in the previous test. Thereafter, the total contents of the upper storage container were allowed to run through the distributor element (speed of rotation, $n= 60$ min. $^{-1}$) into the lower storage container and the latter was then emptied batchwise. The samples were taken as in the case of comparison Test A. The standard deviation of the mixture produced by the method according to the invention was about 2.5 to 3.2 times as high as that of a completely random mixing.

Measured by comparison with the mixing efficiency determined in comparison Test A, and the results obtainable with known mixing apparatus and established according to comparison Test B, the mixing efficiency which is obtainable by the method according to the present invention shows an improvement in the range of about 45 percent.

Further tests have shown that the method and apparatus of the invention are readily adapted to a wide variety of granulated or particulated materials, and especially advantageous results are achieved when it is necessary to treat relatively large cuttings, beads or granules of a synthetic thermoplastic polymer such as the well known fiber-forming linear polyamides (nylon or polycaprolactam) and fiber-forming linear polyesters (polyethylene terephthalate) or other similar polymers which are often used in relatively large particle sizes and weights and cannot be subjected to strong mechanical agitation or mixing. The present invention provides a surprisingly good improvement in the mixing of the granules or particles without requiring any substantial input of mechanical energy, i.e. one can still retain substantially all of the advantages of a purely gravity-flow mixing. At the same time, large volumes of the granular material can be handled without damage or attrition to the individual granules.

We claim:

1. In a process for the gravity-flow mixing of a solid, pourable granular material contained in a vertically elongated storage zone by simultaneously withdrawing said material downwardly by gravity from said storage zone in a plurality of individual approximately equally sized partial streams originating at different heights and radial positions within said storage zone, and then leading said partial streams back together again outside of said storage zone, the improvement which comprises: conducting the reunited partial streams of said material by gravity downwardly through a conveyor tube and imparting a transverse cross-mixing of the individual granules while discharging them from said conveyor tube into a second storage zone.

2. A process as claimed in claim 1 wherein the granules are cross-mixed by rotating a discharge outlet which is directed at least partially laterally outwardly around the vertical axis of the second storage zone.

3. A process as claimed in claim 1 wherein said granular material is withdrawn downwardly by gravity from said second storage zone in a plurality of individual, approximately equally sized partial streams originating at different heights and radial positions within said second storage zone, and said partial streams are again reunited outside of the second storage zone.

4. A process as claimed in claim 3 wherein the reunited partial streams from said second storage zone are likewise subjected to said cross-mixing.

5. A process as claimed in claim 1 which is carried out continuously.

6. A process as claimed in claim 1 wherein different granular materials as individual charges are stratified over the vertical height of said storage zone.

7. In a device for the gravity-flow mixing of solid granular material including a vertically elongated storage tank, a receiving bin located below said storage tank, a plurality of discharge tubes whose upper ends terminate at different heights and radial positions within said storage tank and whose lower ends terminate at about the same height within said receiving bin, means to feed charges of granular material to be mixed into said storage tank and means for the controlled withdrawal of mixed material from said receiving bin, the improvement which comprises: a second vertically elongated storage tank positioned below said receiving bin; conduit means to feed said initially mixed granular material from said receiving bin by gravity to said second storage tank; and a rotating distributor means within said second storage tank adapted to redistribute individual granules horizontally of said tank from said conduit means.

8. A device as claimed in claim 7 wherein said rotating distributor means comprises a vertically positioned tube bent laterally outwardly at its lower end and mounted for rotating around a vertical axis, and means for rotating said bent tube.

9. A device as claimed in claim 7 having a series of at least two of said storage tanks equipped with said receiving bins below each tank respectively and with said interconnecting discharge tubes respectively, wherein said rotating distributor means is inserted in each discharge conduit leading from a receiving bin to the next storage tank positioned therebelow.

10. A device as claimed in claim 9 wherein each rotating distributor means comprises a vertically positioned tube bent laterally outwardly at its lower end and mounted for rotation around a vertical axis, and means for rotating said bent tube.